United States Patent
Rashid-Farrokhi et al.

(10) Patent No.: US 6,304,750 B1
(45) Date of Patent: Oct. 16, 2001

(54) SPACE-TIME DIVERSITY RECEIVER FOR WIRELESS SYSTEMS

(75) Inventors: Farrokh Rashid-Farrokhi, Manalapan; Reinaldo A. Valenzuela, Holmdel, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/188,021

(22) Filed: Nov. 6, 1998

(51) Int. Cl.$^7$ ..................................................... H04B 7/216
(52) U.S. Cl. ......................... 455/137; 455/422; 370/335; 370/342; 375/144; 375/148; 375/349
(58) Field of Search ...................................... 455/137, 422, 455/550; 370/335, 342; 375/144, 148, 349

(56) References Cited

U.S. PATENT DOCUMENTS

| | | | |
|---|---|---|---|
| 5,737,327 | * | 4/1998 | Ling et al. ............................ 370/335 |
| 5,809,020 | * | 9/1998 | Bruckert et al. ...................... 370/335 |
| 5,889,815 | * | 3/1999 | Iwakiri ................................. 370/342 |
| 5,926,503 | * | 7/1999 | Kelton et al. ......................... 375/206 |
| 5,937,014 | * | 8/1999 | Pelin et al. ........................... 375/340 |

FOREIGN PATENT DOCUMENTS

| | | |
|---|---|---|
| 2311446 A | 9/1997 | (GB) . |
| 10173629 A | 6/1998 | (JP) . |

OTHER PUBLICATIONS

European Search Report No. EP 99 30 8679, Feb. 20, 2000—European Patent Office—The Hague.

* cited by examiner

*Primary Examiner*—Daniel Hunter
*Assistant Examiner*—Alan T. Gantt
(74) *Attorney, Agent, or Firm*—Eugene J. Rosenthal

(57) ABSTRACT

The performance of a CDMA receiver employing multiple antennas can be improved, in accordance with the principles of the invention, by directly combining together appropriately weighted signals from the rake receiver fingers that are being supplied by at least two different antennas, i.e., they are in two different receiver modules each of which is what would have been called in the prior art a rake receiver module but without the associated summer, to develop an output with at least as good, and more likely an improved, signal to interference and noise ratio (SINR), as compared to the prior art rake receiver architecture. By doing so the functionality of the beamforming coefficients and the rake multiplier vectors is joined, and it is possible to optimize the rake receiver performance. In other words, because of the inventive architecture, the optimization of the weights for the rake multiplier and the beam forming may be performed jointly to yield a single rake combining weight vector which optimally weights the output of each rake finger. A training sequence which is used to determine the rake combining weight vector may be received as a low bit-rate signal carried on the CDMA pilot signal.

23 Claims, 2 Drawing Sheets

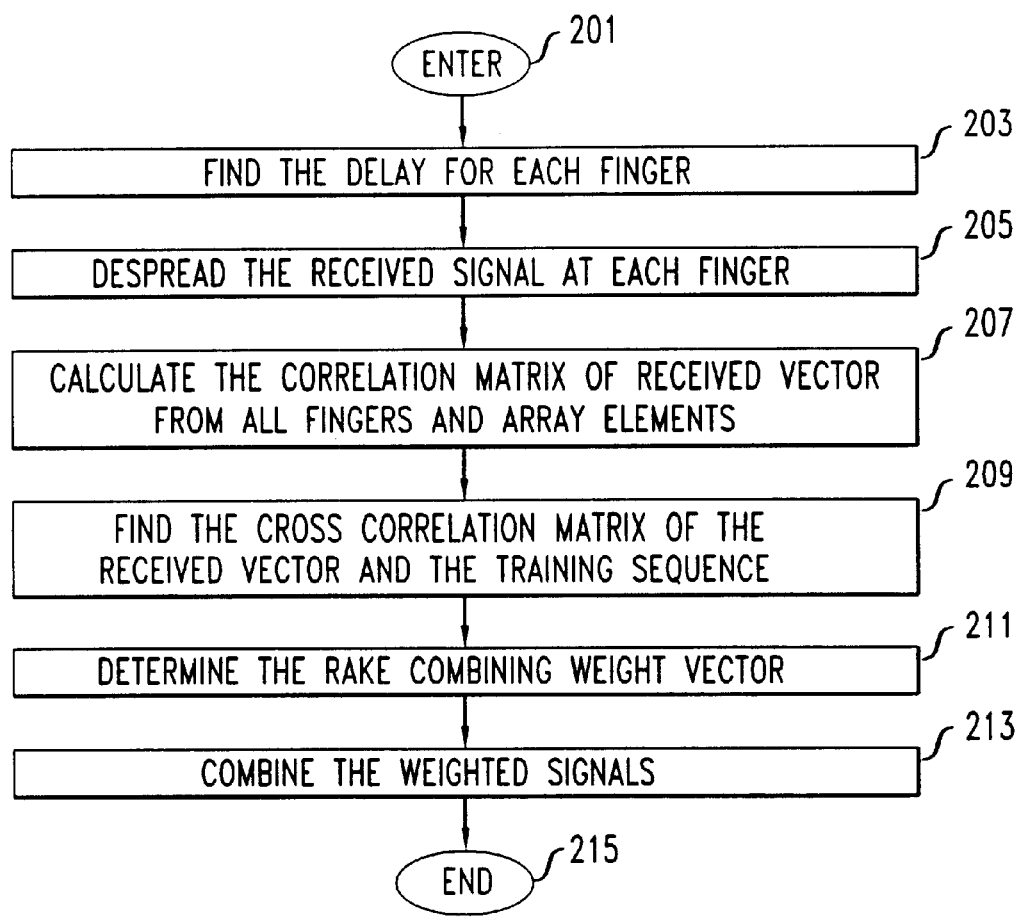

SPACE-TIME DIVERSITY RECEIVER FOR WIRELESS SYSTEMS

TECHNICAL FIELD

This invention relates to the art of wireless communication, and more particularly, to receivers used for code division multiple access (CDMA) systems.

BACKGROUND OF THE INVENTION

Prior art code division multiple access (CDMA) receivers having multiple antennas use a beamforming coefficient vector, i.e., a weight vector, to combine the outputs of several independent rake receiver modules each of which includes multiple rake receiver fingers and a summer, and each of which serves a respective one of the antennas. In such systems, optimization of the beamforming coefficients is performed independently of the optimization of the per-antenna receiver modules, the latter being performed by way of developing the rake multiplier coefficients for each rake receiver module based solely on information available within that rake receiver module. The outputs of the per-antenna receiver modules are weighted using the beamforming coefficient, and the weighted results combined to yield the decision statistic signal.

SUMMARY OF THE INVENTION

We have recognized that the performance of a CDMA receiver employing multiple antennas can be improved, in accordance with the principles of the invention, by directly combining together appropriately weighted signals from the rake receiver fingers that are being supplied by at least two different antennas, i.e., they are in two different receiver modules each of which is what would have been called in the prior art a rake receiver module but without the associated summer, to develop an output with at least as good, and more likely an improved, signal to interference and noise ratio (SINR), as compared to the prior art rake receiver architecture. By doing so the functionality of the beamforming coefficients and the rake multiplier vectors is joined, and it is possible to optimize the rake receiver performance. In other words, because of the inventive architecture, the optimization of the weights for the rake multiplier and the beam forming may be performed jointly to yield a single rake combining weight vector which optimally weights the output of each rake finger. In accordance with an aspect of the invention, a training sequence which is used to determine the rake combining weight vector may be received as a low bit-rate signal carried on the CDMA pilot signal.

BRIEF DESCRIPTION OF THE DRAWING

In the drawing:

FIG. 2 shows an exemplary process performed by rake combining weight calculator of FIG. 1 for developing the weights necessary for the receiver of FIG. 1 to combine the outputs of the rake receiver fingers of all of the receiver modules.

DETAILED DESCRIPTION

Figure 1:
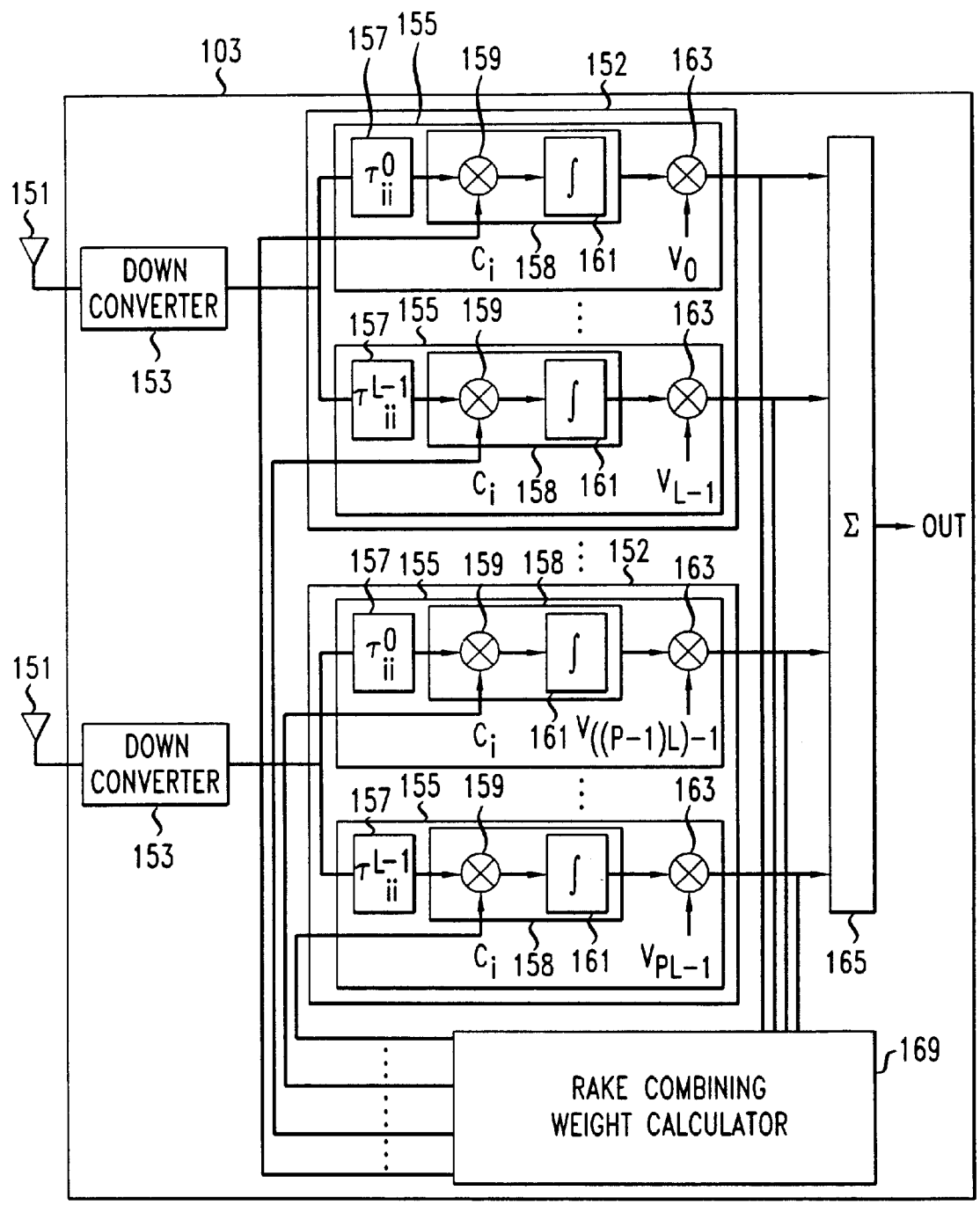
FIG. 1 shows an exemplary code so-called two dimensional "rake" receiver arranged in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

FIG. 1 shows an exemplary code division multiple access (CDMA) wireless receiver 103, which may be used in a wireless terminal or in a base station. Receiver 103 is a so-called two dimensional "rake" receiver arranged in accordance with the principles of the invention. Those portions of receiver 103 shown in FIG. 1 that are conventional will only be briefly described.

Receiver 103 includes a) P antennas 151, b) P down converters 153, c) P receiver modules 152, and d) rake combining weight calculator 169. Each of receiver modules 152 includes L rake receiver fingers 155. Each of rake receiver fingers 155 includes one of delay elements 157, one of despreaders 158, and one of rake combining multipliers 163. Each of despreaders 158 includes one of chip multipliers 159 coupled to one of integrators 161.

Each of antennas 151 receives wireless signals that impinge upon it. Each of down converters 153 downconverts to baseband the wireless signals received by its respective associated one of antennas 151. Each baseband signal generated by one of down converters 153 is then supplied to each rake receiver finger 155 within its respective associated one of receiver modules 152. Note that in accordance with the principles of the invention, and in contrast to the prior art, all of the L rake receiver fingers 155 of each of receiver modules 152 are coupled to combiner 165.

FIG. 2 shows an exemplary process performed by rake combining weight calculator 169 (FIG. 1) for developing the weights necessary for receiver 103 to combine the outputs of all L rake receiver fingers 155 of all P receiver modules 152, in accordance with the principles of the invention. The process is entered in step 201 (FIG. 2) when a new frame is received and it is necessary to determine the rake combining weight vector to be used for the new frame.

Note that each received frame may include a training sequence for use in determining the rake combining weight vector. If so, the training sequence may appear at any point in the frame. For conventional CDMA implementations that do not store the received signals from each of downconverters 153, the weight vector that is developed from a training sequence in a frame is used for one frame time from when it is computed. Should a noncontinuous frame version of CDMA be employed, it may be advantageous to place the training sequence at the beginning of the frame. Alternatively, the received signals from each of downconverters 153 may be stored, with the training sequence being subsequently extracted therefrom. Then the rake combining weight vector is determined using the extracted training sequence, and the determined rake combining weight vector is applied to the stored signal to determine the rest of the information contained in the frame.

Next, in step 203, the delay for each rake receiver finger 155 (FIG. 1) is determined employing conventional methods. Thereafter, in step 205, the received signal at each finger is despread by despreader 158 using chip multiplier 159 coupled to integrator 161, again in the conventional manner. The correlation matrix of all fingers of all receiver modules 152, $\Phi$, is computed in step 207

$$\Phi = \frac{1}{N}\sum_{i=1}^{N} x_i x_i^H,$$

where N is the length of the training sequence and $x_i$ is the despread signal vector—the elements of which are the outputs of each of integrators 161—at the $i^{th}$ symbol of the training sequence; and H means Hermitian, which is the complex conjugate transpose of a vector or a matrix.

In step 209 the cross correlation p of the despread signal vector x and the training sequence is determined as $$p = \frac{1}{N}\sum_{i=1}^{N} x_i d_i^H,$$

where $d_i$ is the $i^{th}$ symbol of the training sequence. The received rake combining weight vector, v, the elements of which are the various weights that are supplied to each of rake combining multipliers 163, is computed as $$v = \arg\min_{v} \sum_{i=1}^{N} |d_i - v^H x_i|^2$$
$$= \Phi^{-1} p$$

Thereafter, the weighted signals are combined by combiner 165, e.g., a summer, to form the output of the rake receiver, which is decision statistic signal from which the particular bits received are determined. The process then exits in step 215.

In accordance with an aspect of the invention, the training sequence may be applied as a low bit-rate signal on the CDMA pilot signal. A separate rake receiver which is used in the receiver, e.g., of the wireless terminal or of the base station, extracts the training sequence as affected by the channel over which it passed, i.e., the pilot channel, and supplies it for use in determining the rake combining weight vector, e.g., for the current frame. This is useful since a) multiple rake receivers are conventionally disposed in each receiver and b) the pilot signal and the frame both pass over the same physical channel, and are subject to the same effects thereby. An advantage of doing so is that no bits of the frame are squandered on the training sequence, so additional system capacity may be achieved.

In another embodiment of the invention, the weight vector may be derived by performing other types of conventional combining, e.g., maximum ratio combining. While use of conventional combining does not yield optimum performance, use of some maximum conventional combining with the architecture of the invention does an improvement in performance over prior art rake receivers.

What is claimed is:

1. A receiver, comprising:
   a plurality of receiver modules, each of said receiver modules including a plurality of rake receiver fingers;
   a rake combining weight calculator for determining a set of weights, each respective weight of said set being supplied to a respective rake combining multiplier in each respective one of said rake fingers, said rake combining weight calculator being responsive to the outputs of all of said rake receiver fingers of all of said receiver modules to determine said weights; and
   a combiner receiving a weighted output from all of said rake receiver fingers of all of said receiver modules, said combiner combining each output from all of said rake receiver fingers of all said receiver modules to produce a composite output, whereby said composite output has a signal to interference and noise ratio (SINR) no less than an SINR of a best of said rake receiver fingers.

2. The invention as defined in claim 1 wherein said receiver further comprises a plurality of downconverters, and wherein each of said receiver modules is supplied with a signal from a different respective one of said downconverters.

3. The invention as defined in claim 1 wherein said receiver further comprises a plurality of downconverters and a plurality of antennas, each one of said downconverters receiving for downconversion a signal from a respective one of said antennas, and wherein each of said receiver modules is supplied with a downconverted signal from a different respective one of said downconverters.

4. The invention as defined in claim 1 wherein said receiver further comprises a plurality of downconverters, and wherein each rake receiver finger within each respective one of said receiver modules is supplied with a same signal from a different respective one of said downconverters.

5. The invention as defined in claim 1 wherein said receiver further comprises a plurality of downconverters and a plurality of antennas, each one of said downconverters receiving for downconversion a signal from, a respective one of said antennas, and wherein each rake receiver finger within each respective one of said receiver modules is supplied with a same downconverted signal from a different respective one of said downconverters.

6. The invention as defined in claim 1 wherein each of said rake receiver fingers comprises:
   a delay element;
   a despreader; and
   a rake combining multiplier.

7. The invention as defined in claim 6 wherein said rake combining weight calculator determines each weight to be supplied to each rake combining multiplier by employing maximum ratio combining.

8. The invention as defined in claim 6 wherein said rake combining weight calculator determines each weight to be supplied to each rake combining multiplier by calculating:
   a correlation matrix $\Phi$ of all rake receiver fingers of each of said receiver modules;
   a cross correlation p of a despread signal vector and a training sequence; and
   $v=\Phi^{-1}$ p;
   where v is vector having as elements each said weight.

9. The invention as defined in claim 8 wherein said training sequence is impressed upon a pilot signal transmitted to said receiver.

10. The invention as defined in claim 8 wherein said training sequence is incorporated within a frame transmitted to said receiver.

11. A receiver, comprising:
   a plurality of rake receiver fingers each including a delay element, a despreader, and a rake combining multiplier;
   means for combing together outputs of said rake receiver fingers;
   wherein a weight vector v, whose individual elements are weights each respective one of which is supplied to said rake combining multiplier of a respective one of said rake receiver fingers, is determined by calculating:
      a correlation matrix $\Phi$ of all of said rake receiver fingers;
      a cross correlation p of (i) a despread signal vector whose elements are supplied as output by each said despreader of each of said rake receiver fingers and (ii) a training sequence; and
      $v=\Phi^{-1}$ p.

12. The invention as defined in claim 11 wherein said training sequence is impressed upon a pilot signal transmitted to said receiver.

13. The invention as defined in claim 11 wherein said training sequence is incorporated within a frame transmitted to said receiver.

14. The invention as defined in claim 11 further including a plurality of downconverters, and wherein groups of said rake receiver fingers are supplied with a same signal from a different respective one of said downconverters as an input.

15. The invention as defined in claim 11 further including a plurality of antennas, and wherein groups of said rake receiver fingers are supplied with a same signal that originated within said receiver from a different respective one of said antennas as an input.

16. A method for use in a receiver including a plurality of rake receiver fingers each including (i) a delay element, (ii) a despreader, and (iii) a rake combining multiplier as well as a combiner for combing outputs of each of said rake receiver fingers together, the method comprising the steps of:
   determining a correlation matrix $\Phi$ of all of said rake receiver fingers;
   computing a cross correlation p of (i) a despread signal vector whose elements are supplied as output by each said despreader of said rake receiver fingers and (ii) a training sequence;
   developing a weight vector $v=\Phi^{-1}$ p;
   supplying each element of weight vector v as an input to a respective one of said rake receiver fingers.

17. The invention as defined in claim 16 wherein each weight vector element received by one of said rake receiver fingers is supplied within said rake receiver finger to said combining multiplier thereof.

18. A receiver, comprising:
   a plurality of rake receiver fingers each generating an output;
   a rake combining weight calculator for determining a weight vector v, each respective weight of said weight vector being supplied to a respective rake combining multiplier in each respective one of said rake fingers, said rake combining weight calculator being responsive to the outputs of all of said rake receiver fingers of said receiver to determine said weights; and
   means for combining said outputs of said rake receiver fingers together;
   wherein each of said rake receiver fingers determines its output as a function of a respective element of a said weight vector v, determined by calculating a maximum ratio combining.

19. The invention as defined in claim 18 wherein said means for combining is a summer.

20. A receiver, comprising:
   a plurality of rake receiver fingers each generating an output;
   means for combining said outputs of said rake receiver fingers together;
   wherein each of said rake receiver fingers determines its output as a function of a respective element of a weight vector v, determined by calculating $v=\Phi^{-1}$ p, where
   $\Phi$ is a correlation matrix of all of said rake receiver fingers;
   p is a cross correlation of (i) a despread signal vector whose elements are supplied as output by a despreader of each of said rake receiver fingers and (ii) a training sequence.

21. The invention as defined in claim 20 wherein said means for combining is a summer.

22. A receiver comprising:
   a plurality of antennas;
   a plurality of downconverters;
   a plurality of delay elements;
   a plurality of despreaders;

a plurality of multipliers;

a summer; and a rake combining weight calculator;

wherein respective ones of said delay elements, despreaders and multipliers are coupled together to form a plurality of rake receiver fingers each generating an output, said summer combines said outputs from each of said rake receiver fingers, and said rake combining weight calculator develops a weight vector v, the elements of which are supplied as inputs to respective ones of said multipliers, v being equal to $\Phi^{-1}$ p, where $\Phi$ is a correlation matrix of all of said rake receiver fingers;

p is a cross correlation of (i) a despread signal vector whose elements are supplied as outputs by said despreaders of said rake receiver fingers and (ii) a training sequence.

23. A method for use in a code division multiple access rake receiver comprising the steps of:

despreading signals received by a plurality of antennas in a plurality of rake receiver fingers to produce despread signals;

weighting said despread signals to produce weighted despread signals, said weighting being performed in said rake receiver fingers using as a weight in each of said rake receiver fingers a respective element of a vector v determined by computing v=$\Phi^{-1}$ p, where $\Phi$ is a correlation matrix of all of said rake receiver fingers and p is a cross correlation of (i) a despread signal vector formed from elements of said despread signals and (ii) a training sequence; and directly combining said weighted despread signals to develop a decision statistic signal.

* * * * *